Jan. 2, 1968

C. C. BROWN ET AL 3,361,453

QUICK COUPLING DEVICE

Filed July 2, 1965

CICERO C. BROWN
JOHN B. DAVIS
INVENTOR.

BY

ATTORNEY

Jan. 2, 1968   C. C. BROWN ET AL   3,361,453
QUICK COUPLING DEVICE

Filed July 2, 1965   3 Sheets-Sheet 2

CICERO C. BROWN
JOHN B. DAVIS
INVENTOR.

BY

ATTORNEY

Jan. 2, 1968
C. C. BROWN ET AL
3,361,453
QUICK COUPLING DEVICE
Filed July 2, 1965
3 Sheets-Sheet 3
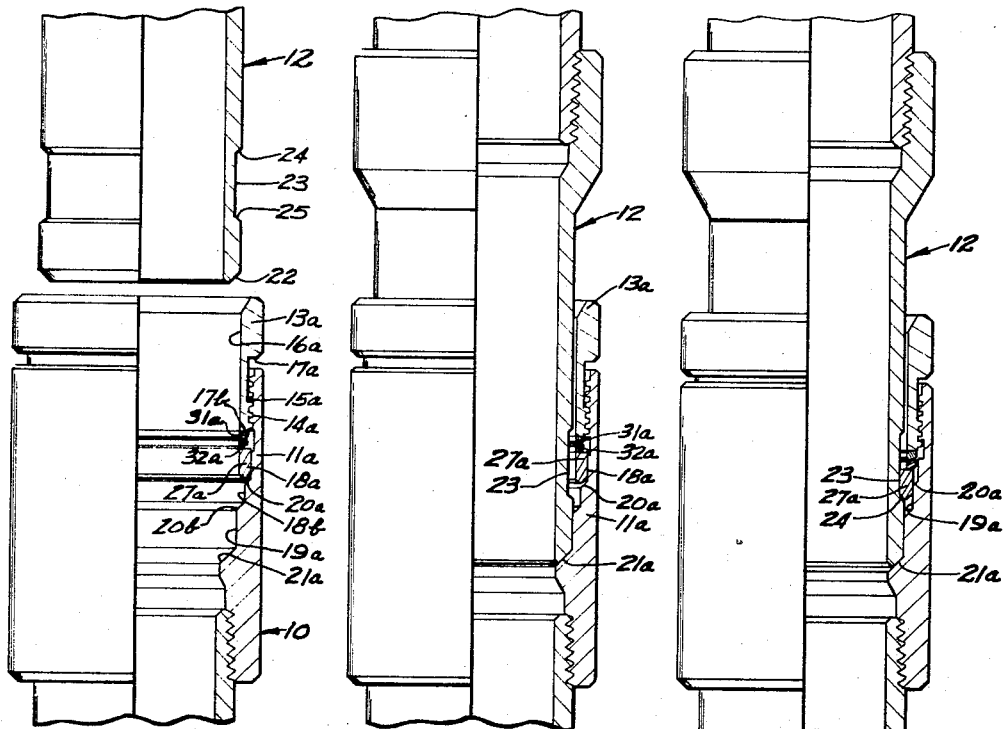
CICERO C. BROWN
JOHN B. DAVIS
INVENTOR.
BY
ATTORNEY

United States Patent Office 3,361,453
Patented Jan. 2, 1968

3,361,453
QUICK COUPLING DEVICE
Cicero C. Brown, c/o Brown Oil Tools, Inc., P.O. Box
19236, Houston, Tex. 77024, and John B. Davis,
Houston Tex.; said Davis assignor to said Brown
Filed July 2, 1965, Ser. No. 469,152
7 Claims. (Cl. 285—321)

ABSTRACT OF THE DISCLOSURE

A quick coupling device, particularly for well pipes, including a socket member, a pin member telescopically receivable in the bore of the socket member to provide metal-to-metal sealing engagement between the inserted end of the pin member and a seat in the socket member, and a split latch ring and a threaded actuating collar therefore, both mounted on the socket member, operable to lock the coupling members in their metal-to-metal sealing engagement.

---

This invention relates to coupling devices for connecting pipe and the like, and more particularly to a quick coupling device for effecting quick connection and release between the coupling members.

In the drilling and equipping of wells, such as oil and gas wells, it is usually necessary to run several pipe strings, ranging from small size tubing to very large diameter casing. These pipe strings are made up by adding sections to the string as the pipe is run into a well bore and disconnecting sections from the pipe string as the string is withdrawn from the well bore, as frequently occurs. In such operations, the form of the connections conventionally employed between the pipe sections are threaded couplings, comprising cooperating male and female members which are screwed together to join the pipe sections carrying the respective coupling members. The coupling threads are of various designs, some coarser than others, but in every instance, quite a number of turns are required to effect complete fluid-tight connection between the pipe sections. The use of such conventional threaded couplings greatly reduces the speed of making-up and breaking-out the pipe sections and the coupling members. In particular, the threads are subject to considerable battering and damage during aligning and initial engagement of the coupling members, so as to frequently result in bad connections and leakage in the joints.

The effective employment of conventional threaded couplings is particularly troublesome where large diameter casing strings, such as the "riser" pipes commonly employed in marine drilling, are required to be made up. A "riser" pipe is the string of large diameter pipe which is conventionally extended from a floating drilling platform to the underlying land through which drilling and other operations are conducted. The riser pipe is conventionally made up as it is lowered through an opening in the platform or over the side thereof. Due to varied motions of the platform on the water surface in response to wind and wave action, the section of pipe being connected to the upper end of the pipe string, since it is suspended from flexible hoisting cables, necessarily engages in considerable swinging and gyratory movement relative to the upper end of the pipe string supported from the platform and also in movement therewith. This makes it very difficult to "stab" the swinging pipe section carrying a conventional coupling member in proper alignment in the upper end of the pipe string so that it can be screwed in place without damage to the coupling threads. This difficulty is also present when running various other casing and pipe strings into a well from a floating drilling platform of any type.

It is, therefore, a primary object of the present invention to provide a coupling device by which the primary connection is effected by a freely slidable telescopic movement of one member into the other and whereby the connection is completed by rotation through only a small number of turns of a coupling collar connected by a relatively coarse thread to the box member.

An important object is the provision of a coupling device employing a box member, a pin member slidably receivable in the box member, a split latch ring adapted to be positioned between the members, and a locking collar surrounding the coupling members and threadably connected to the box member by a relatively coarse thread and arranged to urge the latch ring against an abutment on the pin member to prevent axial retraction of the latter from the box member.

Another object is the provision in a coupling device of the character described of anti-friction bearing means arranged between the locking collar and the latch ring to reduce friction during rotation of the locking collar.

A further object is the provision of a coupling device of the character described, by which two pipe members may be quickly connected and released by a minimum number of rotations of the locking collar.

Yet another object of this invention is to provide a quick coupling device which effects a strong metal-to-metal seal between the coupling elements by the employment of a comparatively few turns of the coupling housing.

An additional object is the provision of a quick coupling of the general character described, employing engaging elements carried by the coupling members to hold the members against relative rotation when they have been engaged.

A still further object of this invention is the provision of a quick coupling device of the character described employing both metal-to-metal seal and a resilient non-metallic seal between the coupling elements.

Other and more specific objects and advantages of this invention will become more readily apparent from the following detailed description when read in conjunction with the accompanying drawing which illustrates several useful embodiments in accordance with this invention.

In the drawing:

FIGS. 9, 10 and 11 are respectively similar to FIGS. 1, 2 and 3, showing still another modification of the coupling.

Figure 1:
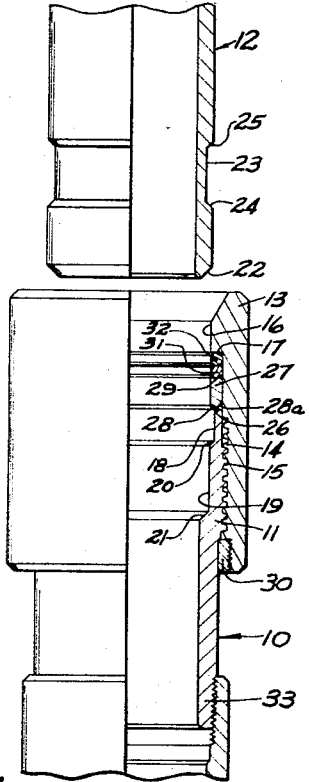
FIG. 1 is a longitudinal, quarter-sectional view illustrating the coupling elements at the position immediately preceding engagement thereof.

Referring to the drawing and to FIGS. 1 to 5, in particular, the coupling device in accordance with this invention comprises a tubular female or box member, designated generally by the numeral 10, including a socket or box 11, and a tubular male or pin member, designated by the numeral 12. The diameter of the pin member is made sufficiently less than that of box 11 to provide a substantial annular space therebetween to permit the pin member to be freely slidably inserted into box 11.

A tubular drive or locking collar 13 is mounted for rotation about the outer end of box 11 and has an axial bore 16 through which pin member 12 is freely slidable for coaxial movement into and out of box 11. Collar 13 is counterbored from one end to define an annular shoulder 17 disposed in axially spaced relation to the outer end of box 11 and extending radially thereover. A section of relatively coarse threads 14 are provided interiorly of collar 13 intermediate its ends and are threadably engaged with a section of complementary threads 15 on the exterior of box 11, whereby collar 13 may be axially advanced and retracted with respect to box 11 in response to corresponding rotation of the collar.

A stop ring 30 is screwed into the lower end of collar 13 below threads 14 to prevent the collar from being completely unscrewed from box 11 during operation of the coupling.

Box 11 has a stepped bore comprising a larger diameter outer section 18 and an inner section 19 of somewhat smaller diameter than outer section 18, the two sections having cylindrical walls joined by an inwardly sloping shoulder 20. The inner end of inner section 19 of the bore terminates in an inwardly sloping annular land 21 adapted to form a seat to be engaged by a correspondingly bevelled end face 22 formed at the outer end of pin member 12. The latter is provided with a cylindrical circumferential groove 23 at a point spaced a short distance rearwardly from end face 22, the ends of the groove being defined by bevelled forward and rearward end walls 24 and 25, respectively. The outer end of box 11 has an inwardly bevelled end face 26. Groove 23 is so spaced with respect to the end of the pin member 12 that when end face 22 is engaged with seat 21, groove 23 will be opposite outer bore section 18.

Figure 3:
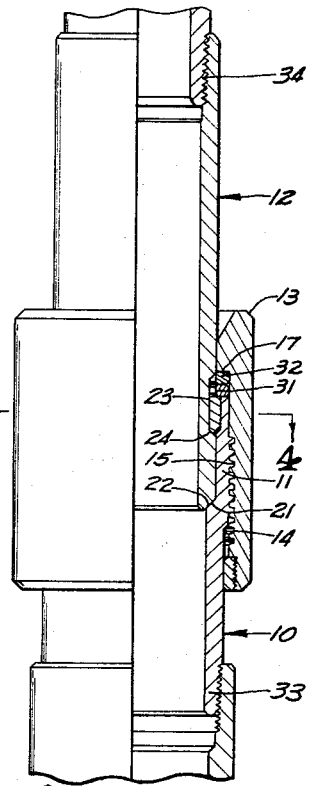
Figure 5:
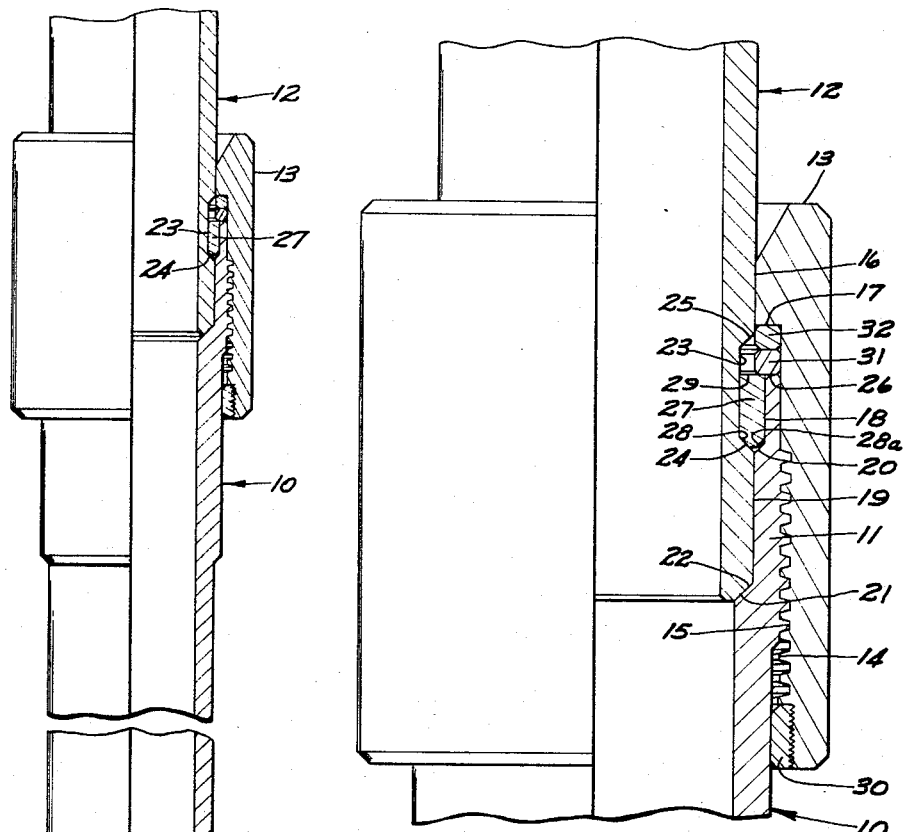
FIG. 5 is a view similar to FIG. 3, but on a considerably enlarged scale.

A split latch ring 27 of resilient construction is positioned in the bore of collar 13. In its normally expanded position, the ring is disposed at a point between the outer end of box 11 and shoulder 17, normally resting on end face 26. The end of latch ring 27 which rests on end face 26 is provided with bevelled faces 28 and 28a sloping toward each other from the inner and outer peripheries of the ring. The opposite end of ring 27 has a flat end face 29. A pair of hard surfaced bearing rings 31 and 32 are seated between end face 29 of the latch ring and shoulder 17 to form an anti-friction bearing between the latch ring and shoulder 17. The inner and outer peripheries of ring 27 are cylindrical and parallel, ring 27 having a thickness such as to substantially fill the space between groove 23 and the wall of outer bore section 18 when pin member 12 has been fully inserted in box 11, as best seen in FIGS. 3 and 5, where, as noted previously, groove 23 will be substantially opposite bore section 18.

Figure 6:
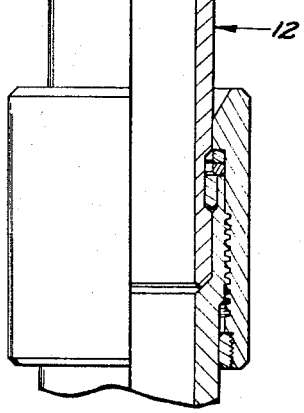
FIG. 6 is a longitudinal, quarter-sectional view showing the respective coupling elements made up as integral parts of the opposite ends of a pipe section.

Box and pin members 10 and 12 carry threaded end connections 33 and 34, respectively, for connecting the coupling members to adjacent pipe sections. It will be understood that connections 33 and 34 may be of any other conventional design for connecting the coupling members to the adjacent pipe sections. As seen in FIG. 6, the coupling members can be made integral with the respective pipe sections, so that each pipe section will carry a box member 10 on one end and a pin member 12 on the other, the box member including the locking collar, the latch ring, and the bearing rings, as shown in this view.

In operation, starting with the coupling device in the uncoupled relation shown in FIG. 1, pin member 12 will be inserted axially through bore 16 of the locking collar through bearing rings 31 and 32 and latch ring 27 into box 11 until end face 22 contacts seat 21 in the box. Locking collar 13 will be in its retracted position, permitting latch ring 27 to be disposed between end face 26 and bearing rings 31 and 32 which are, in turn, seated against shoulder 17. The resiliency of the split ring 27 will normally hold it in this expanded relation when locking collar 31 is in the retracted position, shown in FIG. 1.

After pin member 12 has been inserted in contact with seat 22, as described, locking collar 13 will be rotated in the righthand direction, causing it to advance along the threads on box 11. This advancing movement of the locking collar will act through shoulder 17 against bearing rings 31 and 32 and thence against the outer end of latch ring 27. The axial forces thus exerted against the latch ring will produce a reaction between the bevelled end surfaces of the ring with end face 26, compressing the ring and forcing it off of end face 26 into the annular space defined between groove 23 and bore section 18. Continued rotation of the collar, acting through bearing rings 31 and 32, will then drive ring 27 against the complementary surface of end wall 24 of the groove, thereby strongly urging end face 22 of the pin member against seat 21 and forming a tight metal-to-metal seal between these surfaces. By the employment of relatively coarse threads 14 and 15, only a very small number of turns of collar 13, in some cases only one or two turns depending on the form and pitch of the threads, will be required to drive ring 27 into position strongly locking the coupling members together, as shown in FIGS. 3 and 5.

To release the coupling, it is only necessary to reverse the rotation of collar 13 by a sufficient number of turns to retract shoulder 17 relative to end face 26 a distance sufficient to allow ring 27 to return to its expanded position on top of end face 26. Once collar 13 is thus rotated in the reverse direction a sufficient distance, pin member 12 can be withdrawn from the box. The outward movement of the pin acting through the engagement of end wall 24 with ring 27 will retract the latter until it again attains a position above end face 26, whereupon the resiliency of the ring will spring it outwardly to its initial position and permit the pin member to be withdrawn completely from the locking collar.

By providing the bearing rings 31 and 32 between shoulder 17 and ring 27, the rotation of locking collar 13 will be rendered largely frictionless, greatly speeding the connection and disconnection of the coupling members. It will be understood that other types of anti-friction bearings may be interposed between the drive shoulder on the locking collar and the latch ring, but it is found that the use of one or two hard surfaced bearing rings of the kind illustrated, provides a very simple, low cost, and efficient anti-friction bearing means.

As examples of the kind of threads which may be usefully employed in the present invention, I have employed modified Acme threads ranging from one thread per inch to four threads per inch. In the first instance, only about ¾ of a turn will be required for connecting and disconnecting the coupling. In the case of the four-thread structure, about three turns will be required. In any event, it will be evident that make-up to full tightness will be accomplished with very little rotation of the locking collar. Also it will be seen that the telescopic connection afforded between the pin and box members obviates all danger to the threads, and provides exceptionally quick and easy coupling between the coupling members under ordinarily difficult "stabbing" conditions.

Figure 7:
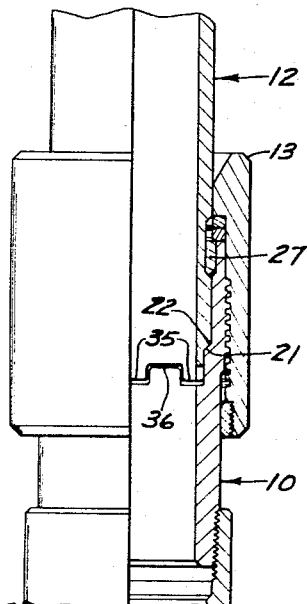
FIG. 7 is a view generally similar to FIG. 3 showing a modified form of the coupling including means for preventing relative rotation between the engaged coupling elements.
Figure 4:
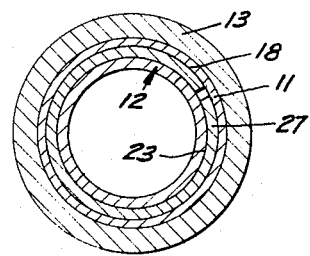
FIG. 4 is a cross-sectional view taken generally along line 4—4 of FIG. 3.

The modification shown in FIG. 7 is illustrative of an arrangement by which the pin and box members may be locked against relative rotation to assure against rotary slippage between the coupling members, despite the metal-to-metal engagement between surfaces 21 and 22.

In this modification, the outer end of pin member 12 carries an extension forming a circumferential series of clutch teeth or splines 35, while box member 10 is provided with upwardly extending circumferentially arranged co-operating splines 36 engageable with clutch teeth 35. In all other respects the coupling is identical with that previously described.

Figure 8:
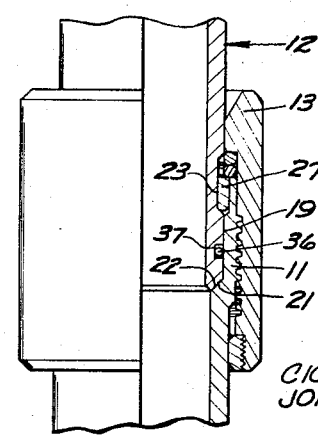
FIG. 8 is a fragmentary view showing a modification of the device having an additional sealing means incorporated therein.

In the modification illustrated in FIG. 8, the coupling while otherwise identical with that previously described, includes an auxiliary non-metallic seal means, such as a conventional elastomeric O-ring 37, seated in an annular groove 38 provided about the portion of the periphery of pin member 12 between end face 22 and annular groove 23. With this embodiment, it will be evident that in addition to the metal-to-metal seal formed between end face 22 and seat 21, a plastic seal will be provided by seal member 37 between the peripheral surface of pin member 12 and the wall of bore section 19 of box 11. In all other respects this embodiment is identical with those previously described.

Figure 2:
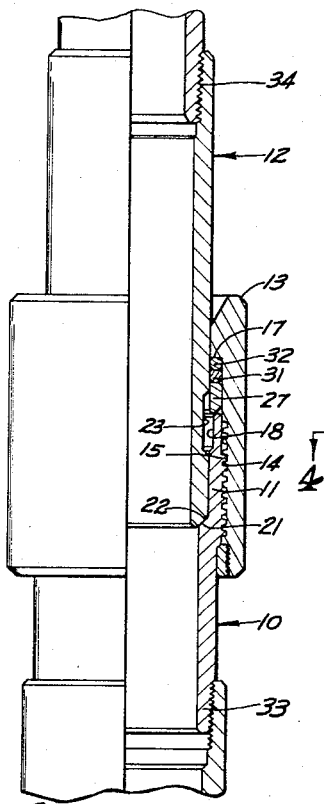
FIGS. 2 and 3 are views similar to FIG. 1 illustrating the positions of the parts at intermediate and final stages of the connection.

FIGS. 9, 10 and 11 are illustrations paralleling FIGS. 1, 2 and 3, respectively, of a further modified form of coupling.

In this modification, box member 10 is provided with a box 11a having a section of internal coarse threads 15a near the upper end of its bore. A locking collar 13a in the form of an externally threaded cylindrical bushing having external threads 14a, is adapted to be screwed into box 10 and has a bore 16a through which pin member 12 may be inserted into box 11a. The latter is counterbored to form a series of stepped bore sections which, beginning a short distance below threads 15a, are numbered 18a, 18b, and 19a. The latter terminates in an inwardly sloping land or seat 21a. Bore sections 18a and 18b are joined by an inwardly sloping shoulder 20a, while sections 18b and 19a are joined by an inwardly sloping shoulder 20b. A split latch ring 27a, in its initial expanded condition, is seated in bore section 18a on shoulder 20a and is of the same configuration as ring 27 of the previously described embodiment. One or more annular anti-friction bearing rings 31a and 32a are positioned between one end of ring 27a and an end face 17b formed by the inner end of collar 13a. The latter is provided with an external shoulder 17a extending radially outwardly over the upper end of box 11a to limit movement of collar 13a in making up the coupling.

As seen in FIGS. 10 and 11, when pin member 12 is inserted through the bore of collar 13a into box 11a and engages seat 21a, collar 13a will be rotated and will act through bearing rings 31a and 32a on the outer end of latch ring 27a, forcing the latter off of shoulder 20a into bore section 18a into the annular space defined between bore section 18a and groove 23, the inner end of ring 27a being thus thrust against end wall 24 of the groove to hold end face 22 of pin member 12 in strong metal-to-metal contact with seat 21a.

With this modification, it will be seen that the threaded connection between the locking collar and the box may be either an internal or external connection, both arrangements functioning effectively to effect quick connection and disconnection between the coupling members.

It will be understood that various other alterations and modifications may be made in the details of the illustrative embodiment within the scope of the appended claims but without departing from the spirit of this invention.

What we claim and desire to secure by Letters Patent is:

1. A quick coupling device, comprising, a tubular box member having an axial bore, a tubular pin member dimensioned to be freely slidable into said bore and to define a substantial annular space between the pin and box member, an annular seat in said bore engageable by the outer end of the pin member to form a metal-to-metal seal therewith, inwardly inclined shoulder means in said bore spaced from said seat, said pin member having a circumferential groove spaced from its outer end and defined by spaced end walls, a split latch ring slidably disposed in said bore adjacent said shoulder means, a locking collar adapted to slidably receive the pin member mounted on and threadably engaged with said box member by means of a section of relatively coarse threads, said collar provided with means thereon engageable with said latch ring and operable in response to the advancement of said collar along said threads and in cooperation with said shoulder means to move said latch ring through said annular space into said groove in retained thrusting engagement with the forward end wall of said groove to thereby lock the pin member against axial movement relative to the box member with said outer end of the pin member disposed in said metal-to-metal sealing engagement with said annular seat, and means carried by said pin and box members operable upon engagement of the outer end of said pin member with said seat to lock said pin and box members against relative rotation.

2. A quick coupling device, comprising, a tubular box member, a tubular pin member telescopically slidably receivable in the box member, said box member having a bore defined by an outer cylindrical wall section and an inner cylindrical wall section of smaller diameter than said outer section, a downwardly and inwardly sloping shoulder connecting said sections, a downwardly and inwardly sloping annular seat formed at the inner end of said inner section, and a downwardly and inwardly sloping end face formed on the outer end of said outer section, said pin member having a circumferential groove spaced from its outer end defined by inclined end walls, the outer end of said pin member having a bevelled end face engageable with said seat to form a metal-to-metal seal therewith, a split metallic latch ring having cylindrical inner and outer peripheries positioned in the bore of said box member to slidably receive said pin member, adapted when urged axially inwardly of said bore over said inwardly sloping end face to move into latching position between said outer wall section and said circumferential groove into engagement with the forward end wall in said groove, a locking collar adapted to slidably receive said pin member mounted on and threadably connected to said box member, said collar provided with means thereon having end-wise engagement with said latch ring and operable by rotation of said collar to urge said latch ring to said latching position and to hold said pin member in said metal-to-metal seal with said seat, said means including an internal shoulder on said collar and anti-friction bearing means disposed between said internal shoulder and the adjacent end of said latch ring.

3. A quick coupling device according to claim 2 including a non-metallic plastic seal means carried by one of said members and arranged to form a seal between said members in addition to said metal-to-metal seal.

4. A quick coupling device according to claim 2 wherein said threads are modified Acme threads and have a pitch in the range from one thread-per-inch to four threads-per-inch.

5. A quick coupling device according to claim 2 wherein said means provided on said collar engageable with said latch ring is a shoulder extending radially over the end of said latch ring.

6. A quick coupling device according to claim 2 wherein the threads on said box are external threads and those on said collar are internal threads.

7. A quick coupling device according to claim 2 wherein the threads on said box are internal threads and those on said collar are external threads.

References Cited

UNITED STATES PATENTS

| | | | |
|---|---|---|---|
| 1,586,276 | 5/1926 | Woodruff | 285—314 X |
| 1,867,296 | 7/1932 | Woodruff | 285—341 |
| 2,267,716 | 12/1941 | Boynton | 285—330 |
| 2,320,813 | 6/1943 | Cowles | 285—348 X |
| 2,532,632 | 12/1950 | MacArthur | 285—333 X |
| 2,599,003 | 6/1952 | Leonard | 285—321 X |
| 2,783,809 | 3/1957 | Haines | 285—330 X |

FOREIGN PATENTS

| | | |
|---|---|---|
| 832,183 | 6/1938 | France. |
| 94,713 | 9/1959 | Norway. |

CARL W. TOMLIN, *Primary Examiner.*

DAVE W. AROLA, *Assistant Examiner.*